Patented Sept. 14, 1943

2,329,486

UNITED STATES PATENT OFFICE 2,329,486

TERPENE DERIVATIVES

Alfred L. Rummelsburg, Wilmington, Del., assignor to Hercules Powder Company, Wilmington, Del., a corporation of Delaware No Drawing. Application May 31, 1941,
Serial No. 396,219

10 Claims. (Cl. 260—609)

This invention relates to methods for the production of sulfur-containing terpene compounds and to the products formed thereby; more particularly, it relates to the production of sulfur-containing compounds of acyclic terpenes having three double bonds per molecule and to the products formed thereby.

In accordance with this invention, it has been found that when an acyclic terpene having three double bonds per molecule, in any of its monomeric or polymeric modifications, is reacted with sulfur or various sulfur-containing compounds, there results a series of highly interesting and useful compounds. The reaction products themselves have important uses as flotation agents. In addition, they serve as intermediates for the preparation of plasticizers for haloflenated rubber, adhesives, etc.

As stated hereinabove, any of the monomeric or polymeric forms of acyclic terpenes having three double bonds per molecule, as for example, allo-ocimene, ocimene, myrcene, etc., may be employed in accordance with this invention. In particular, allo-ocimene is preferred inasmuch as, in addition to having three double bonds per molecule, this material has them in a triply conjugated arrangement. Hereinafter, in this specification, an acyclic terpene having three double bonds per molcule will be referred to for convenience as an acyclic terpene.

To derive a polymer of an acyclic terpene from the monomer, any of the processes known in the art may be utilized. For example, it is desired to include polymerization with phosphoric acid catalysts, such as, orthophosphoric acid, tetraphosphoric acid, hypophosphoric acid, metaphosphoric acid, pyrophosphoric acid, etc., also with metal halide catalysts, such as, stannic chloride, aluminum chloride, zinc chloride, boron trifluoride and its molecular complexes with ethers and acids, etc. In addition, activated clays, including silica gel, fuller's earth, diatomaceous earth, activated alumina, etc., may be employed to accomplish the polymerization. The polymerization may be carried out with or without the use of an inert, volatile, organic solvent, such as, benzene, xylene, gasoline, ethylene dichloride, etc. For additional information relating to the particular procedures employed, see co-pending applications for United States Letters Patent of A. L. Rummelsburg, Serial No. 370,664, filed December 18, 1940, and Serial No. 370,665, filed December 18, 1940.

If the polymerization is carried out with phosphoric acid catalysts, a liquid product is formed containing a substantial quantity of the dimer. In actual practice, the product will contain from about 75% to 95% of the dimer, depending upon the conditions of reaction, such as, the type of phosphoric acid used, the concentration of catalyst, the particular solvent, the temperature of reaction, etc. The thiocyanate value of the product may vary from about 120 to about 240. If desired, after the catalyst has been removed, the substantially pure dimer may be separated from the remaining constituents by distillation under reduced pressure. The substantially pure dimer is the preferred form of polymeric acyclic terpene to be employed in accordance with the invention.

In carrying out the polymerization with metal halide catalysts, liquid polymers may also be obtained following the procedure as given in my co-pending application for United States Letters Patent, Serial No. 370,664, filed December 18, 1940; however, by employing particular metal halides and suitably controlling the conditions of the reaction, solid polymers of the acyclic terpene employed result. For example, when a metal chloride, and preferably an aluminum chloride, is used, generally solid polymers result. These solid polymers are formed when the reaction is carried out over wide ranges of temperature and using various inert solvents. Preferably, however, to form solid polymers, the reaction is carried out at a temperature within the range of from about −35° C. to about 60° C. with the acyclic terpene dissolved in a halogenated organic solvent, such as, ethylene dichloride, etc.

These solid polymers which are prepared by the processes above described contain substantial quantities of polymeric constituents higher than the dimer. It has been determined that these organic solids have at least about 70% of polymeric constituents higher than the dimer. They are further characterized by having lower thiocyanate values than do the liquid polymers, the values for the former falling within the range of from about 20 to about 80.

In accordance with this invention, then, an acyclic terpene such as allo-ocimene is reacted with sulfur or a sulfur-containing compound. The sulfur-containing compounds which may be utilized in carrying out the reaction comprise hydrogen sulfide, sulfur halides such as $S_2Br_2$, $S_2Cl_2$, $S_2F_2$, $SI_6$, etc., and alkyl mercaptans such as methyl, ethyl, propyl, butyl, etc., mercaptans. In the case of hydrogen sulfide and the alkyl mercaptans, a catalyst of the type to be described hereinafter will be employed. With sulfur and the sulfur halides, however, a catalyst is not necessary, nor is it desirable.

In carrying out the reaction, the acyclic terpene may or may not be dissolved in an inert solvent such as benzene, toluene, butanol, gasoline, etc., as desired. It is often preferable, however, when a solid polymeric form of the acyclic terpene is employed, to carry out the reaction with an inert solvent present in order to assure better contact of the reactants. Employing an acyclic terpene or its solution, the reactant is contacted with the desired sulfur or sulfur-containing reactant either with or without the presence of a suitable catalyst as determined by the particular reactants employed. Desirably, the reaction mixture is agitated either throughout the whole or part of the reaction period. The reaction may be carried out at various temperatures and over different periods of time. While a temperature within the range of from about 0° C. to about 250° C. for a period of from about 1 hour to about 100 hours is suitable for the reaction, a temperature within the range of from about 20° C. to about 180° C. and for a period of from about 2 hours to about 24 hours, is preferably employed. Ordinarily atmospheric pressure is conveniently employed in carrying out the reaction. However, when one or more of the reactants is gaseous at the temperature at which the reaction is carried out, superatmospheric pressure is preferred inasmuch as its use results in increased speed of reaction. In this instance, the pressure may vary from about atmospheric to about 100 atmospheres.

As heretofore stated, a catalyst will be employed to promote the reaction when either hydrogen sulfide or an alkyl mercaptan is employed. Suitable catalysts comprise acids, such as, sulfuric acid, phosphoric acid, acetic acid, etc.; acid anhydrides, such as phosphorus pentoxide, etc.; bases, such as, potassium hydroxide, sodium hydroxide, monoamylamine, diamylamine, triamylamine, the ethanolamines, aniline, pyridine, etc.; contact catalysts, such as, activated carbon, silica gel, etc.; dimethyl sulfate; metallic aluminum; and metal sulfides. In addition, various combinations of catalysts may be used in place of a single catalyst. It is preferred in carrying out the reaction inherent in this invention to use an acid catalyst, and it is still further preferred that such a catalyst be used in conjunction with a contact catalyst, such as, activated charcoal, silica gel, fuller's earth, activated magnesium silicate, bauxite, activated alumina, etc. If desired, certain of these contact catalysts, may, prior to use be calcined at temperatures between about 250° C. and about 500° C.

The amount of catalyst to be employed, when required, may be varied from about 0.01 to about 2.00 times the amount of acyclic terpene used, however, some reaction will take place when greater or lesser amounts of the catalyst are employed. The mineral acid catalysts, when such are employed, will desirably be employed in the form of their aqueous solutions having a mineral acid concentration within the range of from about 20 to about 100%. When sulfuric acid is employed as the catalyst, however, it is preferably employed in the form of a solution having a concentration with respect to the sulfuric acid not greater than 75%. Otherwise, sulfonation of the acyclic terpene may take place. When using mineral acids ac catalysts, it is advisable to add the catalyst at intervals during the progress of the reaction rather than all at once at the start of the reaction. These acid catalysts lose much of their activity after having once been used in the reaction, but activity may be restored by adding a small amount of anhydrous or concentrated acid to the spent catalyst. Reactivation may also be accomplished by heating the spent catalyst at a temperature of from about 80° C. to about 120° C. for about an hour, cooling, and filtering through activated charcoal.

At the end of the reaction period, the reaction mixture, if an acid catalyst has been employed in accordance with this invention, will separate into two layers. The layer containing the acyclic terpene reaction product may be separated and the catalyst remaining in the product may be removed in any desirable manner, preferably by washing with water. Any inert solvent which may have been employed in carrying out the reaction may be removed, preferably by distillation under reduced pressure. The product may then be dried in any desired manner. If other catalysts have been employed in accordance with the invention, they may be removed by methods known to the art.

There follow several specific examples which illustrate particular embodiments of the principles underlying this invention. These examples, however, are not to be construed as being limiting. All parts and percentages are by weight unless otherwise indicated.

*Example 1*

Four hundred and ten parts of monomeric allo-ocimene (90% pure) and 850 parts of 85% orthophosphoric acid were reacted with hydrogen sulfide at a temperature of from 25° C. to 40° C. and at a pressure of 175 to 200 lbs. per sq. in. for 14½ hours in a rotating autoclave. After this reaction period, the contents of the autoclave were removed and allowed to separate into two layers. The phase containing the treated allo-ocimene was removed and washed with water to remove the catalyst. The product was then dried with anhydrous $Na_2SO_4$ and thereafter shaken with several parts of Filter-Cel (diatomaceous earth). 447 parts of an amber-colored liquid remained which analyzed 16.8% sulfur.

*Example 2*

To 75 parts of monomeric allo-ocimene (62% pure) were added 24 parts of flowers of sulfur and the mixture heated at 100° C. for a period of 72 hours with intermittent agitation. The other constituents of the crude allo-ocimene employed were $\alpha$-pinene, dipentene and a small amount of unidentified terpenes. The sulfur dissolved completely without evolution of hydrogen sulfide. After the initial reaction period, the reaction mixture was heated at 195° C. for 4 hours. Some hydrogen sulfide evolved. The product was a dark-colored liquid having a sulfur content of 15.0%.

*Example 3*

To 100 parts of monomeric allo-ocimene (60% pure) were added 48 parts of ethyl mercaptan and 170 parts of 85% orthophosphoric acid, and the mixture was agitated at 25° C. to 30° C. for 11 hours in a rotating autoclave. The allo-ocimene employed contained in addition to the allo-ocimene, $\alpha$-pinene, dipentene and a small amount of unidentified terpenes. The resulting mixture was then allowed to stand at about 23° C. for 48 hours. The mixture was found to have separated into two layers, the one containing the treated allo-ocimene and the other the acid. The former was separated and water washed to remove the acid present. Unreacted mercaptan was removed by distillation at 20 mm. and at 40° C. The product was a light-colored oil which analyzed 8.7% sulfur.

*Example 4*

Thirty-eight parts of sulfur monochloride were added to 75 parts of allo-ocimene (90% pure) over a period of 0.5 hour with agitation and cooling to maintain a temperature of 12° C.–24° C. No hydrochloric acid was evolved as a result of the reaction which took place. There was, however, a decided increase in the viscosity of the mixture. The product was then allowed to stand at 25° C.–30° C. for 170 hours. It was afterwards dissolved in ether, water washed and dried with anhydrous sodium sulfate. The ether was removed by distillation to yield a dark-colored viscous liquid having a sulfur content of 14.9% and a chlorine content of 12.3%.

*Example 5*

One hundred and fifty parts of polymerized allo-ocimene, consisting substantially entirely of the dimer, and 35 parts of flowers of sulfur were gradually heated to a temperature of 180° C. under an air condenser over a period of 2 hours with agitation. Heating was continued at 180° C. to 200° C. for about 6 hours. Some hydrogen sulfide was evolved. The product was a viscous oil at room temperature containing about 15% of combined sulfur.

*Example 6*

Two hundred parts of polymerized allo-ocimene, consisting substantially entirely of the dimer, and 340 parts of 85% orthophosphoric acid were agitated in an atmosphere of hydrogen sulfide at a temperature of 25° C. to 40° C. and at a pressure of 175 to 215 lbs. per sq. in. for a period of 24 hours. After this reaction period, the acid phase was separated, and the remaining phase containing the allo-ocimene reaction product was water washed and dried with anhydrous sodium sulfate. The product at room temperature was a viscous oil containing about 5% of combined sulfur.

*Example 7*

Two hundred parts of allo-ocimene (95% pure), 300 parts of 85% orthophosphoric acid and 25 parts of activated carbon were agitated in an atmosphere of hydrogen sulfide at a pressure of 180 to 250 lbs. per sq. in. at a temperature of 25° C to 40 C. for a period of 24 hours. The acid phase was separated and the remaining phase containing the allo-ocimene reaction product was then water washed to remove traces of acid. The product was then filtered and dried with anhydrous sodium sulfate. It was found to contain 22% of combined sulfur.

When, in carrying out the reaction according to the processes of this invention, hydrogen sulfide is employed as the sulfur-containing reactant, the hydrogen sulfide adds to the acyclic terpene at the unsaturated double bonds with the resultant formation of mercaptans and/or sulfides. The proportion of these materials in the product may vary depending upon the conditions of reaction. Mono-mercaptans will be formed by simple combination between one molecule of hydrogen sulfide and one molecule of unsaturated terpene compound, whereas by the interaction of several molecules of each reactant or by the reaction of the mercaptans first formed with itself or with unreacted acyclic terpene, various sulfides or thio-ethers may result. In the presence of an oxidizing agent such as air, the mercaptans may be further changed to di- or polysulfides. In addition, poly-mercaptans may result from the addition of hydrogen sulfide to more than one double bond of a single acyclic terpene molecule.

When, in carrying out the reaction according to the processes of this invention, a sulfur halide is employed as the sulfur-containing reactant, the sulfur halide adds to the acyclic terpene at the double bonds. The addition reaction takes place predominately when the temperature of the reaction mixture is held within the range of from 0° C. to about 30° C. At higher temperatures, reactions other than straight addition take place.

When an alkyl mercaptan is employed in accordance with this invention, an addition reaction takes place at the unsaturated centers of the acyclic terpene and polymerized acyclic terpene resulting in the formation of an acyclic terpene alkyl sulfide.

When elemental sulfur is employed in accordance with this invention, an addition reaction at the double bonds of the acyclic terpene or polymerized acyclic terpene takes place. At temperatures of from about 60° C. to about 100° C., this addition reaction predominates, whereas increasing the reaction temperature to 150° C. to 200° C. causes additional reaction with the liberation of hydrogen sulfide to form complex sulfur-containing condensates.

It will be understood that it is not the intent to limit the instant invention to the theoretical limitations as hereinbefore described but that the invention as contemplated is directed to the products resulting from the application of the methods of the invention as broadly described.

The sulfur-containing compounds of acyclic terpenes produced in accordance with this invention may be used as flotation agents. They may in addition, be used as intermediates for the production of plasticizers for halogenated rubber, adhesives, etc.

It will be understood that the details and examples hereinbefore set forth are illustrative only and that the invention as broadly described and claimed is in no way limited thereby.

This application is a continuation-in-part of my application for United States Letters Patent, Serial No. 382,749, filed March 11, 1941.

What I claim and desire to protect by Letters Patent is:

1. The reaction product of a material selected from the group consisting of the monomers and polymers of acyclic terpenes having three double bonds per molecule, and hydrogen-sulfide.

2. The reaction product of an acyclic terpene having three double bonds per molecule and hydrogen sulfide.

3. The reaction product of a polymer of an acyclic terpene having three double bonds per molecule and hydrogen sulfide.

4. The reaction product of allo-ocimene and hydrogen sulfide.

5. The reaction product of monomeric allo-ocimene and hydrogen sulfide.

6. The method of producing a new composition of matter which comprises reacting a material selected from the group consisting of the monomers and polymers of an acyclic terpene having three double bonds per molecule, with hydrogen sulfide, in the presence of a catalyst until reaction is at least partially complete.

7. The method of producing a new composition of matter which comprises reacting at a temperature within the range of from about 0° C. to about 250° C., a material selected from the group consisting of the monomers and polymers of an acyclic terpene having three double bonds per molecule, with hydrogen sulfide, in the presence of a catalyst until reaction is at least partially complete.

8. The method of producing a sulfur-containing compound of allo-ocimene which comprises reacting monomeric allo-ocimene with hydrogen sulfide in the presence of an acid catalyst.

9. The method of producing a sulfur-containing compound of allo-ocimene which comprises reacting monomeric allo-ocimene with hydrogen sulfide in the presence of phosphoric acid.

10. The method of producing a sulfur-containing compound of allo-ocimene which comprises reacting monomeric allo-ocimene with hydrogen sulfide in the presence of a mixed catalyst comprising a contact catalyst and an acid catalyst.

ALFRED L. RUMMELSBURG.